US009157607B2

(12) United States Patent
Wang et al.

(10) Patent No.: US 9,157,607 B2
(45) Date of Patent: Oct. 13, 2015

(54) LIGHT CONTROL LENS AND LIGHT SOURCE DEVICE USING THE SAME

(71) Applicant: E-PIN OPTICAL INDUSTRY CO., LTD., Taipei (TW)

(72) Inventors: Chih-Peng Wang, Taipei (TW); Huang-Chang Chen, Taipei (TW); Chin-Hsin Tu, Taipei (TW)

(73) Assignee: E-PIN OPTICAL INDUSTRY CO., LTD., Taipei (TW)

( * ) Notice: Subject to any disclaimer, the term of this patent is extended or adjusted under 35 U.S.C. 154(b) by 39 days.

(21) Appl. No.: 13/764,218

(22) Filed: Feb. 11, 2013

(65) Prior Publication Data

US 2014/0003059 A1  Jan. 2, 2014

(30) Foreign Application Priority Data

Jun. 29, 2012 (TW) .............................. 101123520 A

(51) Int. Cl.
| F21V 13/04 | (2006.01) |
| F21V 5/04 | (2006.01) |
| G02B 19/00 | (2006.01) |
| F21Y 101/02 | (2006.01) |
| F21V 8/00 | (2006.01) |

(52) U.S. Cl.
CPC ................. F21V 13/04 (2013.01); F21V 5/048 (2013.01); G02B 19/0028 (2013.01); G02B 19/0061 (2013.01); F21Y 2101/02 (2013.01); G02B 6/003 (2013.01); G02B 6/0073 (2013.01)

(58) Field of Classification Search
CPC ......... F21V 5/04; F21V 13/04; F21V 13/046; F21V 5/046; F21V 5/048
USPC .......... 362/311.01–311.06, 311.09, 326, 327, 362/329, 334, 335, 307–310; 359/642, 359/708–712, 720, 726
See application file for complete search history.

(56) References Cited

U.S. PATENT DOCUMENTS

| 6,961,190 | B1 * | 11/2005 | Tamaoki et al. ............... 359/726 |
| 7,499,228 | B2 * | 3/2009 | Jeong et al. .................... 359/708 |
| 8,348,475 | B2 * | 1/2013 | Wilcox et al. ................. 362/332 |
| 8,454,205 | B2 * | 6/2013 | Holder et al. ............. 362/311.02 |
| 2006/0227431 | A1 * | 10/2006 | Yoon et al. ..................... 359/708 |
| 2009/0052192 | A1 * | 2/2009 | Kokubo et al. .......... 362/311.09 |
| 2010/0091489 | A1 * | 4/2010 | Pearson et al. ................ 362/235 |
| 2010/0195335 | A1 * | 8/2010 | Allen et al. .................... 362/309 |
| 2011/0121341 | A1 * | 5/2011 | Lee et al. ......................... 257/98 |
| 2011/0164426 | A1 * | 7/2011 | Lee .............................. 362/335 |
| 2012/0140486 | A1 * | 6/2012 | Chou ....................... 362/311.02 |

* cited by examiner

*Primary Examiner* — Jong-Suk (James) Lee
*Assistant Examiner* — Christopher E Dunay
(74) *Attorney, Agent, or Firm* — Muncy, Geissler, Olds & Lowe, P.C.

(57) ABSTRACT

The present disclosure discloses a light control lens and a light source device using the same. The light control lens comprises a light emitting surface, a light incident surface, and a total internal reflection (TIR) inclined surface. The light incident surface and the TIR inclined surface are at the opposite side of the light emitting surface. The TIR inclined surface is at the peripheral side of the light incident surface. Between the TIR inclined surface and a plane perpendicular to an optical axis of the light control lens, there is an included angle $\alpha$ of less than 45°. An effective radius of the light emitting surface is larger than the distance from an arbitrary point on the light emitting surface to a plane through an incident origin and perpendicular to the optical axis along the optical axis direction.

15 Claims, 7 Drawing Sheets

LIGHT CONTROL LENS AND LIGHT SOURCE DEVICE USING THE SAME

FIELD OF THE INVENTION

The present invention relates to a lens and a light source device using the same, and more particularly to a light control lens and a light source device using the same applied for various illumination devices using light-emitting diodes (LEDs) as light source.

BACKGROUND OF THE INVENTION

LCD displays are widely used in TVs, laptop computers, PCs, mobile phones, and other electronic products having display function. In an LCD display, cold cathode fluorescent lamp (CCFL), field-effect light-emitting device (EL), light-emitting diode (LED), or other elements capable of emitting a visible light are used as a backlight. In recent years, LED has gradually become a preferred backlight source instead of CCFL because of its various advantages including: long lifetime (about 100,000 hours), capability of optimizing color gamut, small size/design flexibility, low-voltage power supply driven, short turn-on time, no inverter needed, efficiently operated over a wider temperature range and so on.

An LED backlight device generally comprises an LED matrix for providing an LCD panel illumination. In order to make the LCD panel be illuminated with uniform light, and prevent the LCD panel illuminated with bright spots, using a lens to refract the light from an LED is the mainly solution in prior arts. Therefore, in the LCD display using LEDs as backlight source, the way to enhance the uniformity of brightness or make the light distribution be wider is the main issue for improving the LED backlight device. For example, U.S. Pat. Nos. 7,348,723, 7,963,680, 7,621,657, 7,798,679, 7,866, 844, 7,766,530, US Patent Publication No. 2009/0116245, U.S. Pat. Nos. 7,474,475, and 7,746,565, all disclose lenses or LED devices designed for an LCD panel.

A light beam from an LED chip has peak intensity (in unit of candela) at an optical axis of the LED chip, and weaker intensities with the greater the included angle between the light beam and the optical axis. Due to the above feature, conventional light source devices are improved for better light uniformity by many kinds of optical lenses each having a light emitting surface and/or a light incident surface with enhanced refractive power to reduce the luminous intensity of a paraxial region of the light source device, and compensate said luminous intensity to a far-axis region of the light source device. As a result, a Fresnel's reflection phenomenon tends to be generated on the light emitting surface, thereby decreasing the total flux of the light source device. Therefore, a light control lens that is capable of distributing light beam evenly as well as increasing the light utilization efficiency is needed for solving light loss because of partial reflection at the light emitting surface of the conventional light source devices.

SUMMARY OF THE INVENTION

An aspect of the present disclosure is to provide a light control lens and a light source device with improved light utilization efficiency. By the light control lens, light reflected from a light emitting surface of the light control lens can be reused. Moreover, a light beam will be redistributed by the light control lens, such that luminous intensity in a region far from an optical axis of the light beam can be compensated to provide a light pattern with improved illumination uniformity and an effective divergence angle of at least 120°.

According to the aspect of the present disclosure, a light control lens comprising a light emitting surface, a light incident surface and a total internal reflection (TIR) inclined surface is provided. The light emitting surface is an aspherical surface and satisfies the condition (1): $0 \leq R_{ER}/R_E \leq 0.5$. Wherein, $R_{ER}$ represents a distance from an apex of the light emitting surface to an optical axis of the light control lens along a direction perpendicular to the optical axis; and $R_E$ represents the effective radius of the light emitting surface. The light incident surface is opposite to the light emitting surface, and constitutes a cavity having an opening, in which a center of the opening represents an incident origin. Wherein, L1 represents a distance from the incident origin to the light incident surface; and θ represents an included angle between the optical axis and a connecting line from the incident origin to the arbitrary point on the light incident surface. Wherein, at least in the range of $\pi/18 < \theta < 2\pi/9$, L1 decreases as θ increases. The effective radius of the light emitting surface is larger than a distance from an arbitrary point on the light emitting surface to a plane through the incident origin and perpendicular to the optical axis along the optical axis direction. The TIR inclined surface is opposite to the light emitting surface, and at a peripheral side of the light incident surface. An included angle α between the TIR inclined surface and a plane perpendicular to the optical axis is less than 45°. When a light beam enters the light control lens through the light incident surface, and then is incident at the light emitting surface, at least a part of the light beam reflected from the light emitting surface is totally internally reflected by the TIR inclined surface, and then passes through the light control lens.

In the light control lens, the light incident surface may further include a first optically active area, a second optically active area, and a first optical path conversion point. The first optically active area is disposed at the center of the light incident surface; the second optically active area is connected with a periphery of the first optically active area. The first optical path conversion point is disposed at the junction between the first optically active area and the second optically active area. The first optical path conversion point satisfies the condition (2): $0.71 \geq \cos\theta_0 \geq 0.51$. Wherein, $\theta_0$ represents an included angle between the optical axis and a connecting line from the first optical path conversion point to the incident origin. Wherein, in the range of $\theta < \theta_0$, L1 decreases as θ increases; in the range of $\theta \geq \theta_0$, L1 increases or maintains a certain value as θ increases. Therefore, the light incident surface of the light control lens can be provided with proper refractive power to refract the light beam near the optical axis toward a direction perpendicular to the optical axis. Further, the light beam far from the optical axis can be properly redistributed to reduce the diameter of a central dark region of a light pattern. By the above feature, luminous intensity of the redistributed light beam in a region near the optical axis can be decreased, thereby compensating luminous intensity to the region far from the optical axis and improving the light distribution uniformity and the effective divergence angle of the redistributed light beam.

Further, the light control lens may satisfy the following condition (3), such that the light control lens can further have proper refractive power, and control the diameter of the central dark region of the light pattern at an appropriate size for enhancing light distribution uniformity.

$$10 \leq \frac{\tan\theta_e}{\tan\theta_k} \leq 50 \quad \text{condition (3)}$$

Wherein, $\theta_e$ represents an included angle between the optical axis and a connecting line from a point of intersection of the light emitting surface and the optical axis to the apex of the light emitting surface; $\theta_k$ represents an included angle between the optical axis and a connecting line from a point of intersection of the light incident surface and the optical axis to the first optical path conversion point.

In the light control lens, the light emitting surface may further satisfy the condition (4): $0<R_{E0}\leq 0.01$ mm, and include a first recession portion disposed at the center of the light emitting surface, and a convex portion connected to the outer periphery of the first recession portion. Wherein, $R_{E0}$ represents a radius of curvature of the light emitting surface at the point of intersection with the optical axis. Therefore, the light emitting surface of the light control lens can further have proper refractive power to refract the light beam near the optical axis toward a direction perpendicular to the optical axis, thereby decreasing luminous intensity of the redistributed light beam in the region near the optical axis, and improving the light distribution uniformity and the effective divergence angle of the redistributed light beam.

In some embodiments, the light incident surface of the light control lens may include a first optically active area, a second optically active area, and a second optical path conversion point. The first optically active area is disposed at a center of the light incident surface, and further includes a second recession portion. The second optically active area is connected with a periphery of the first optically active area, and forms a concave surface facing toward the incident origin. The second optical path conversion point is disposed at a junction between the first optically active area and the second optically active area. The light incident surface may further satisfy the following condition (5) and condition (6). Wherein, $\theta'_0$ is an included angle between the optical axis and a connecting line from the incident origin to the second optical path conversion point. In the light incident surface, in the range of $\theta<\theta'_0$, L1 increases as $\theta$ increases; in the range of $\theta'_0 \leq \theta \leq 45°$, L1 decreases as the angle $\theta$ increases. By the second recession portion, the light incident surface can properly concentrate the light beam near the optical axis. Therefore, an uneven illumination problem of the visible central dark region of the light pattern caused by a conventional light control lens which refracts most of the light beam toward the direction perpendicular to the optical axis can be overcome.

$$R_{ir}/R_i \leq 0.3 \quad \text{condition (5)}$$

$$0.6 \leq \frac{\overline{OI_0} \times \tan\theta'_0}{S_{ir}} < 1.1 \quad \text{condition (6)}$$

Wherein, $R_{ir}$ represents a diameter of the light incident surface at the second optical path conversion point; $R_i$ represents a diameter of the light incident surface; $\overline{OI_0}$ represents a distance from the incident origin to the point of intersection between the light incident surface and the optical axis; and $S_{ir}$ represents a distance from the second optical path conversion point to the point of intersection between the light incident surface and the optical axis along an optical surface of the first optically active area.

Furthermore, in the first optically active area of the light incident surface having the second recession portion, with the increasing of an included angle between the optical axis and a connecting line from the incident origin and the arbitrary point on the first optically active area, a slope of the tangent of the arbitrary point on the first optically active area first may increase and then decrease.

In some embodiments, the light control lens may further comprise at least one extending portion at the periphery of the light incident surface. The extending portion extends to a side opposite to the light emitting surface, and satisfies the condition (7): $20°<\beta\leq 50°$. Wherein, $\beta$ represents an included angle between the optical axis and a connecting line from the incident origin to a point of intersection between the light emitting surface and an extension line of an inner side of the extending portion in a central cross-section of the light control lens. Moreover, the at least one extending portion may satisfy the condition (8): $51°<\gamma\leq 75°$. Wherein, $\gamma$ represents an included angle between the optical axis and a connecting line from the incident origin to a point of intersection between the light emitting surface and an extension line of an outer side of the extending portion in a central cross-section of the light control lens. In an optional embodiment, the at least one extending portion may further include a tapered recess portion for reflecting the at least a part of the light beam reflected from the light emitting surface. By the tapered recess portion, the reflected light can be reused more efficiently.

In some embodiments, the control lens may further include a bottom surface opposite to the light emitting surface. The bottom surface is extended from the light incident surface and connected to the TIR inclined surface. In an optional embodiment, the light control lens may further include a light source fixing part disposed at the periphery of the light incident surface for fixing a light source.

According to the aspect of the present disclosure, a light source device is provided. The light source device comprises the above mentioned light control lens and an LED. The LED is provided with an emitting surface emitting a light beam, in which the emitting surface is disposed corresponding to the light incident surface of the light control lens. In one preferred embodiment, the center of the emitting surface of the LED may be disposed at the optical axis of the light control lens. The emitting surface of the LED may be disposed at, or under a first plane where the opening of the cavity constituted by the light incident surface of the light control lens is located. In other embodiments, the emitting surface of the LED may be disposed in the cavity constituted by the light incident surface.

In the light source device, the LED may include single LED chip having a square, rectangular or polygonal shape. For other different applications, the LED may include two or more LED chips provided at intervals, and a ratio between the intervals and a diameter of the emitting surface of the LED is from 0.04 to 0.9.

By the above light control lens and the light source device using the same, one or more of the following advantages is obtained.

(1) By the optical structure of the light control lens, a light pattern with improved illumination uniformity and an effective divergence angle of at least 120° can be provided. Particularly, by being provided with the TIR inclined surface, light utilization efficiency of the light source device can be increased, and luminous intensity in the region far from the optical axis can be compensated by the reused reflected light. Therefore, the illumination uniformity and the effective divergence angle of the light source device can be improved. Moreover, the present disclosure can effectively reduce the number of the light source device, thereby reducing the volume of a surface light module using LEDs, the heat accumulation in the surface light module and costs.

(2) Furthermore, by optionally adding with the limitations selected from the group consisting of the condition (2), condition (2) and condition (3), condition (5) and condition (6), or condition (4), the refractive power of the light emitting surface or the light incident surface of the light control lens can be properly controlled. Therefore, the light control lens can distribute the light beam more evenly. Therefore, in the region near the optical axis of the light pattern, the region having different illumination such as bright spot or dark area can be prevented, or be controlled to be difficult to distinguish, for example, to decrease the diameter of the region having different illumination, or to ease the illumination difference thereof. Therefore, the light source device with improved illumination uniformity is further easy to be made, and the degree of freedom in the light control lens design can be increased.

(3) Moreover, by optionally adding with the limitations of the condition (7) and/or condition (8), the at least one extending portion can be disposed in a preferred position and be provided with a sufficiently large surface area to mount on a substrate. Therefore, the at least one extending portion is further easily used for mounting the light control lens on a substrate, and for heat dissipation. In addition, installation stability of the light control lens assembled with the LED can be further increased.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The structure and technical features of the present invention will now be described in considerable detail with reference to some embodiments and the accompanying drawings thereof, so that the present invention can be easily understood.

Figure 1A:
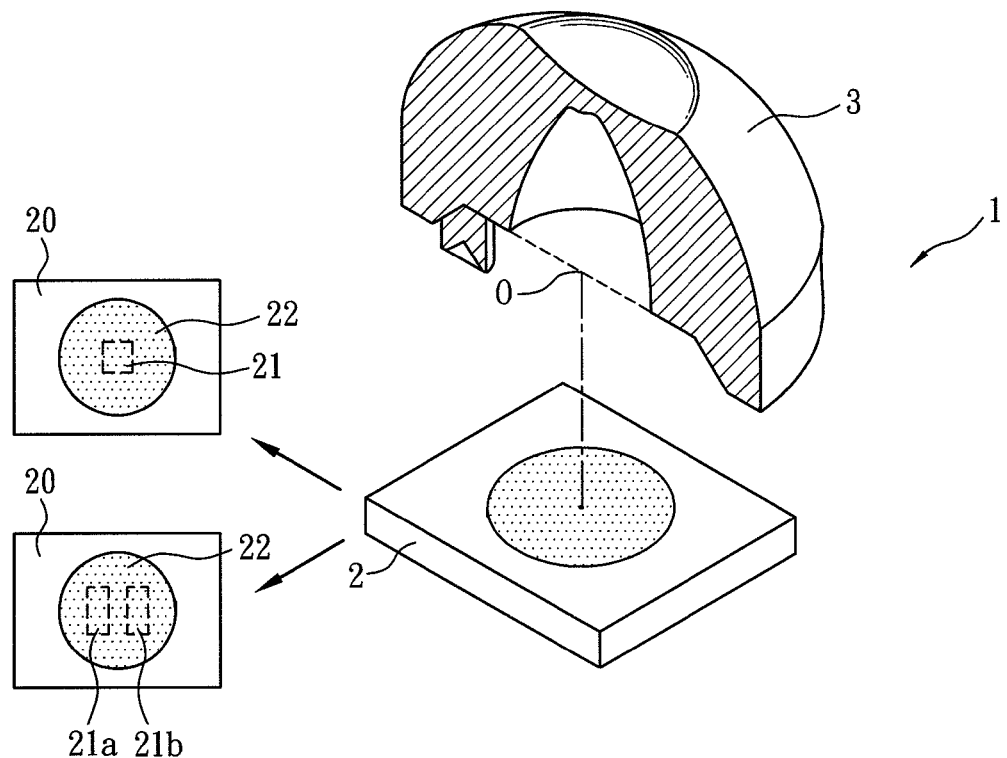
FIG. 1A and FIG. 1B are schematic diagrams illustrating two embodiments of light source devices according to the present disclosure.
Figure 1B:
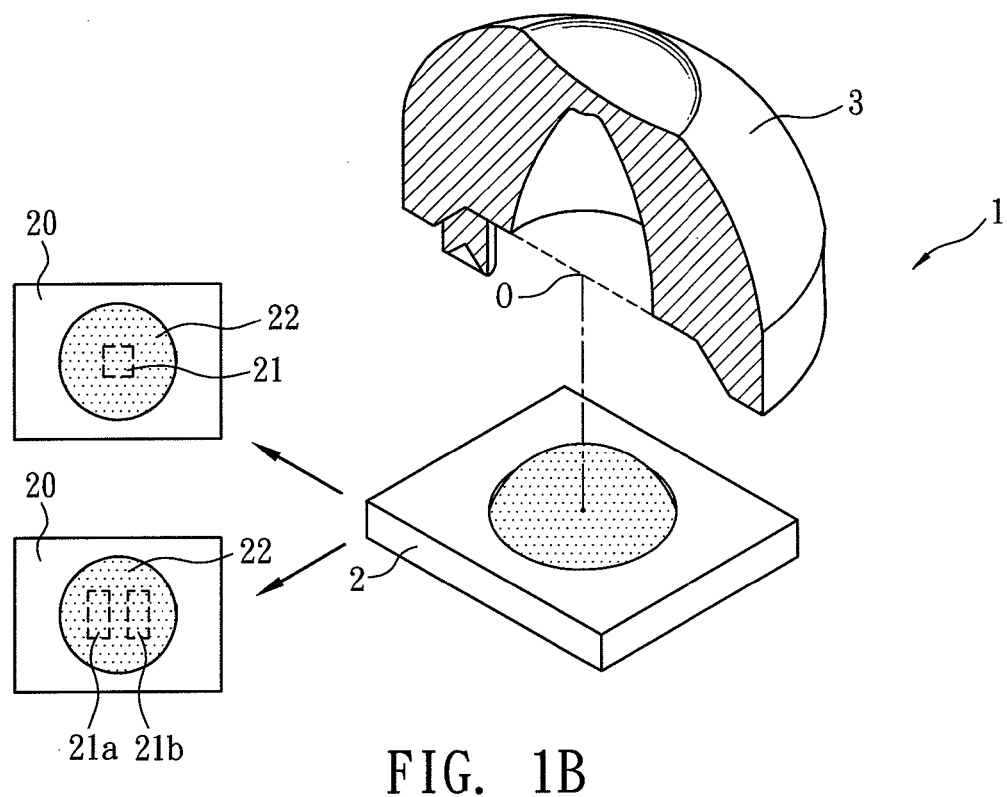
Figure 4:
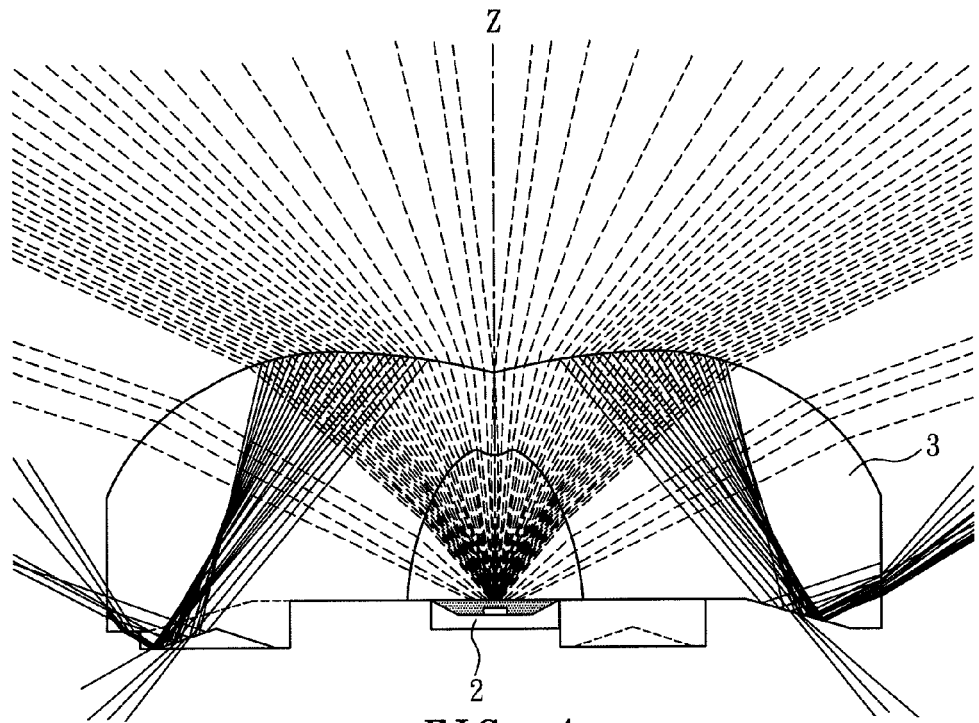
FIG. 4 is a schematic diagram of optical path of a light source device according to one embodiment of the present disclosure.
Figure 8:
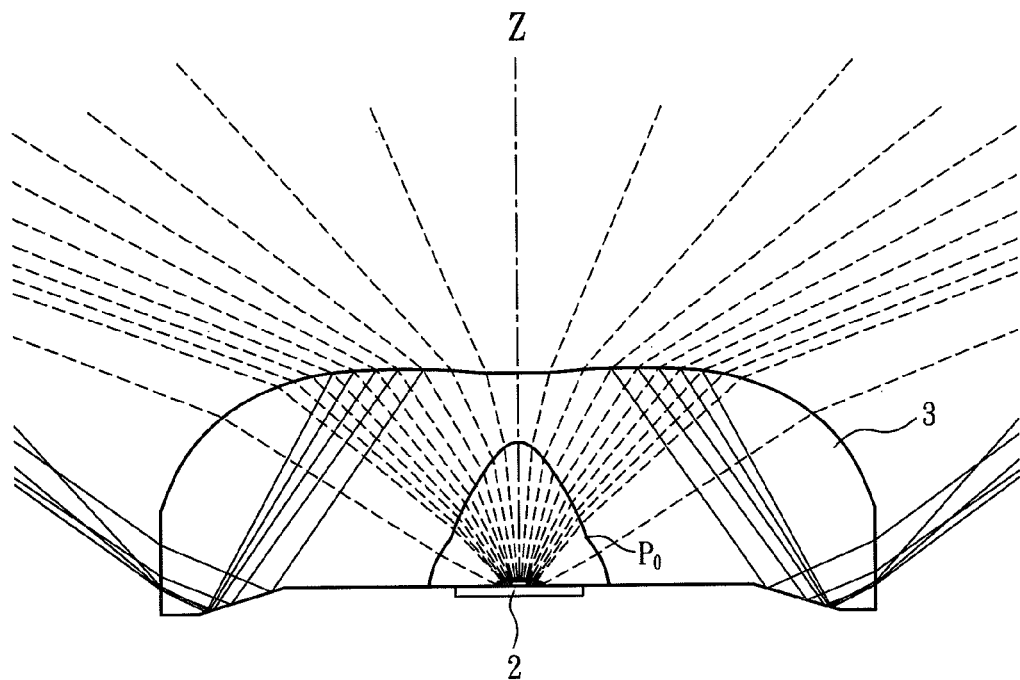
FIG. 8 is a cross-sectional view illustrating a light source device of the second example according to the present disclosure.

FIG. 1A and FIG. 1B are schematic diagrams of light source devices according to different embodiments of the present disclosure. The light source device 1 of the present disclosure can be applied in an LED backlight module or other illumination devices and includes an LED 2 and a light control lens 3. The LED 2 is provided with an emitting surface which emits a light beam, and may include, but not limited to, a substrate 20, an LED chip 21, and a fluorescent glue layer 22. The LED 2 can include single LED chip 21 having a square, rectangular or polygonal shape. However, in some embodiments for different applications, the LED 2 can include two or more LED chips 21a, 21b provided at intervals, and a ratio between the intervals and a diameter of the emitting surface of the LED is from 0.04 to 0.9. The LED 2 can provide the light beam that has higher intensities in a paraxial region and lower intensities in an off-axis region thereof. Furthermore, the LED 2 may provide a light pattern having peak intensity at an optical axis thereof, and weaker intensities with the greater the included angle between the light beam and the optical axis. As shown in FIG. 1A and FIG. 4, the LED chip(s) 21 (21a, 21b) can be disposed in a recession of the substrate 20, in which the recession can be filled with the fluorescent glue layer 22 to cover and fix the LED chip(s) 21 (21a, 21b) on the substrate 20, so that an opening of the recession can be the emitting surface of the LED 2. In some embodiments, as shown in FIG. 1B and FIG. 8, the LED chip(s) 21 (21a, 21b) can be disposed on the substrate 20, and the fluorescent glue layer 22 can cover the LED chip(s) 21 (21a, 21b) by coating or dispensing. Further, for different applications, the fluorescent glue layer 22 can be molded to form a specific optical surface for redistributing the light beam. For example, the LED chip(s) can be covered with the fluorescent glue layer having a specific optical surface for distributing the light beam evenly. Additionally, the fluorescent glue layer 22 can be made of silicon oxide resin mixing with a wavelength conversion material such as phosphor.

Figure 2:
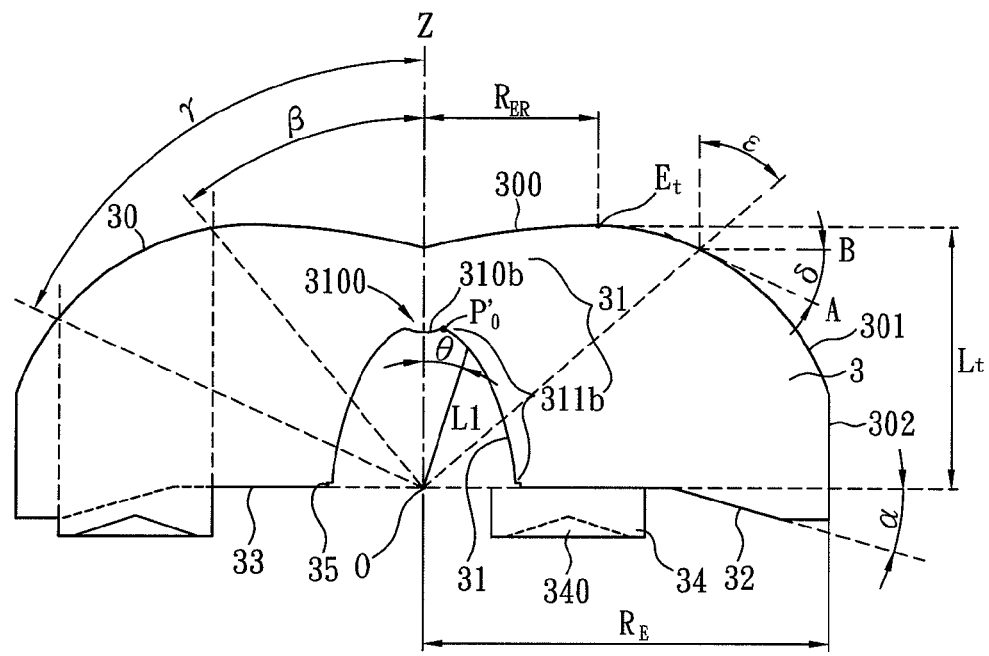
FIG. 2 is a central cross-sectional view of a light control lens according to one embodiment of the present disclosure.
Figure 3:
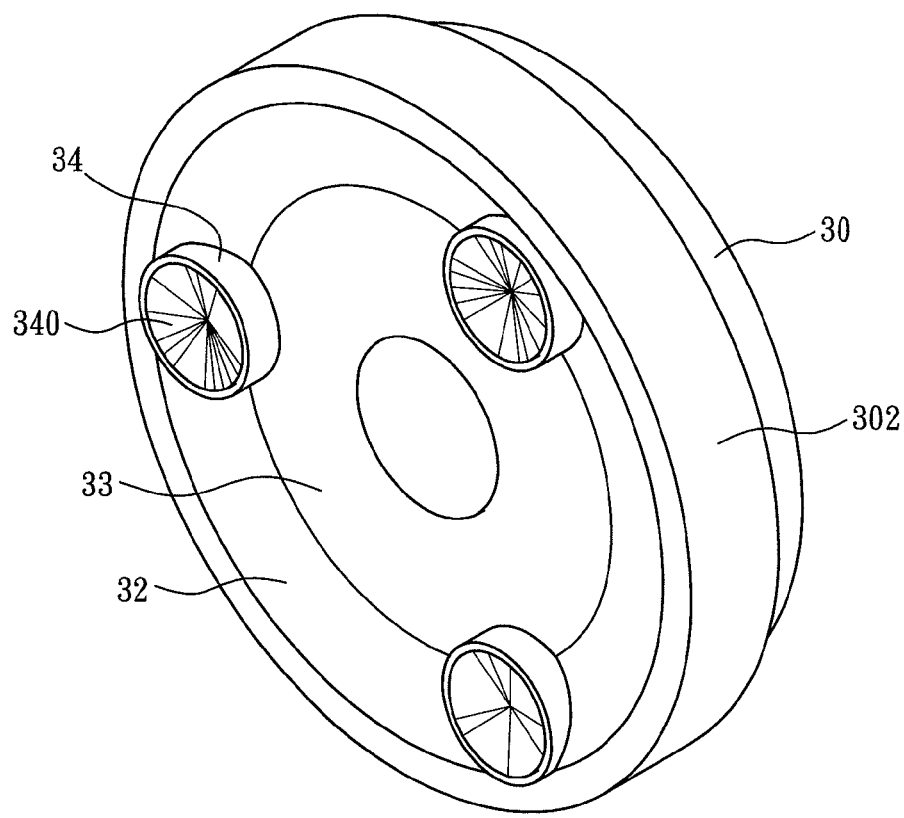
FIG. 3 is an oblique bottom view of a light control lens according to one embodiment of the present disclosure.

FIG. 2 shows a central cross-sectional view of a light control lens according to one embodiment of the present disclosure. FIG. 3 shows an oblique bottom view of a light control lens according to one embodiment of the present disclosure. The light control lens 3 has an optical axis Z, and includes a light emitting surface 30, a light incident surface 31, and a total internal reflection (TIR) inclined surface 32. The light incident surface 31 is opposite to the light emitting surface 30, and constitutes a cavity having an opening. FIG. 4 shows a schematic diagram of optical path of a light source device according to one embodiment of the present disclosure. As shown in FIG. 4, the light control lens 3 has a shape that can refract the light beam from the LED 2 to be away from the optical axis of the light source device 1, such that the effective divergence angle of the light source device 1 is enhanced.

The light control lens 3 can further include a bottom surface 33 opposite to the light emitting surface 30, in which the bottom surface 33 is extended from the light incident surface 31 and connected to the TIR inclined surface 32. Further, for enhancing light utilization rate of the light source device 1, the bottom surface 33 can be coated with a reflection layer or attached with other materials capable of reflecting light. In some embodiments, to avoid uneven illumination caused by the concentrated light beam after light incident through the bottom surface 33, the bottom surface 33 may be provided with a plurality of irregular projections and irregular dents.

The optical axis of the light source device 1 indicates a central axis of the three-dimensional a light beam emitted from the light source device 1 through the light control lens 3. In the light source device 1, the light incident surface 31 of the light control lens 3 may be disposed on the emitting surface of the LED 2. In some embodiments, in the light source device 1, the optical axis Z of the light control lens 3 is perpendicular to the emitting surface of the LED 2. For a more precise combined process, the optical axis Z of the light control lens 3 may pass through a geometric center of the emitting surface of the LED 2. In some embodiments, the optical axis Z of the light control lens 3 is coincided with a mechanical axis of the LED 2 or an optical axis of the LED 2. In the following embodiments, the optical axis Z of the light control lens 3 is coincided with the mechanical axis of the LED 2, but the present invention is not limited to.

Figure 7:
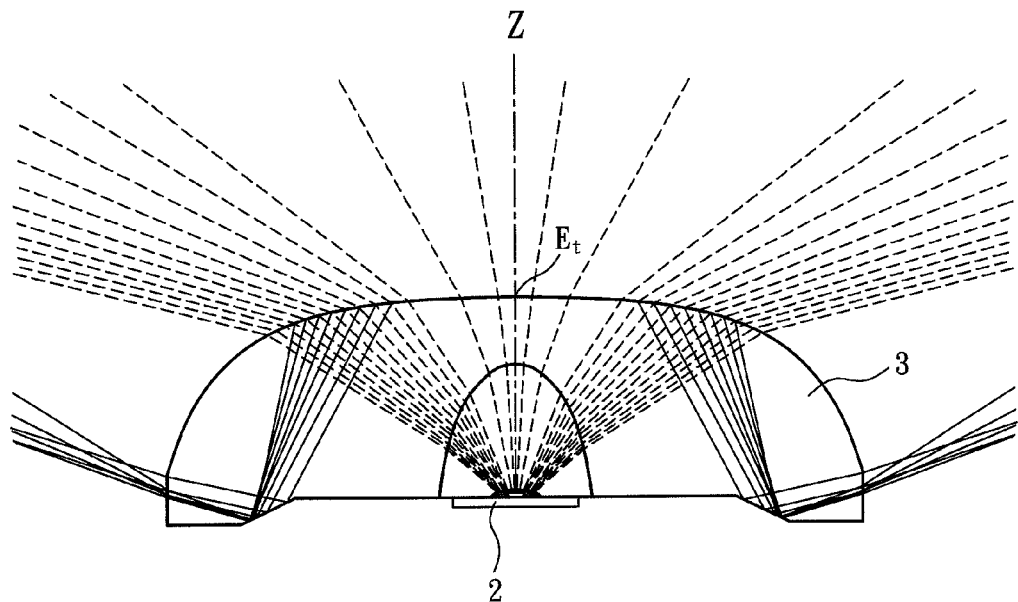
FIG. 7 is a cross-sectional view illustrating a light source device of the first example according to the present disclosure.
Figure 9:
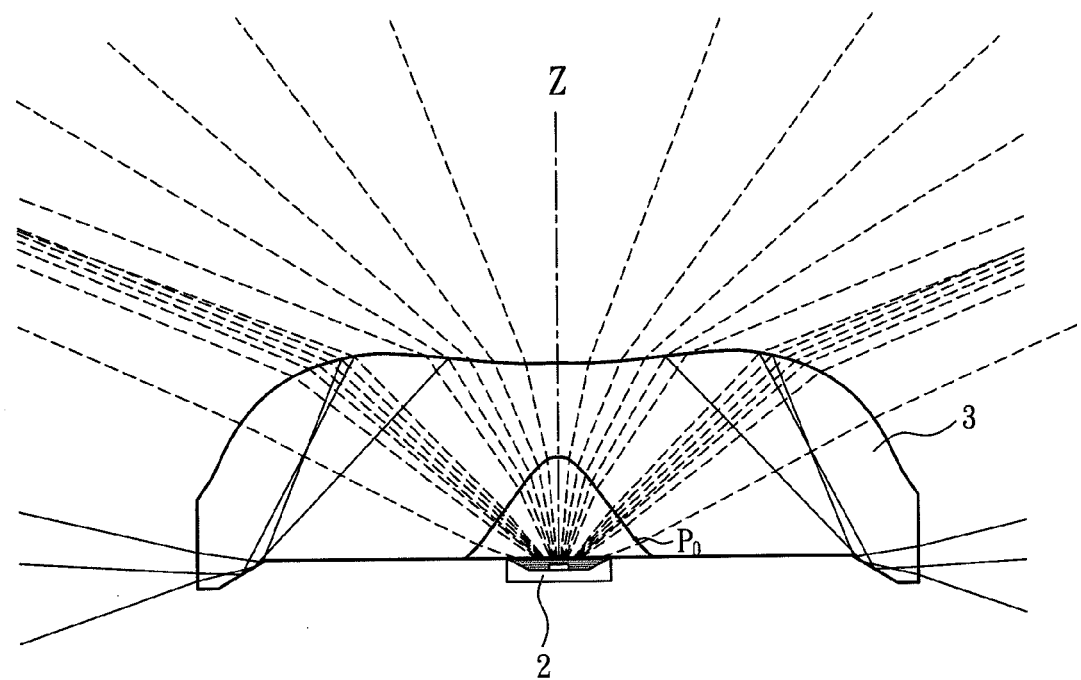
FIG. 9 is a cross-sectional view illustrating a light source device of the third example according to the present disclosure.
Figure 11:
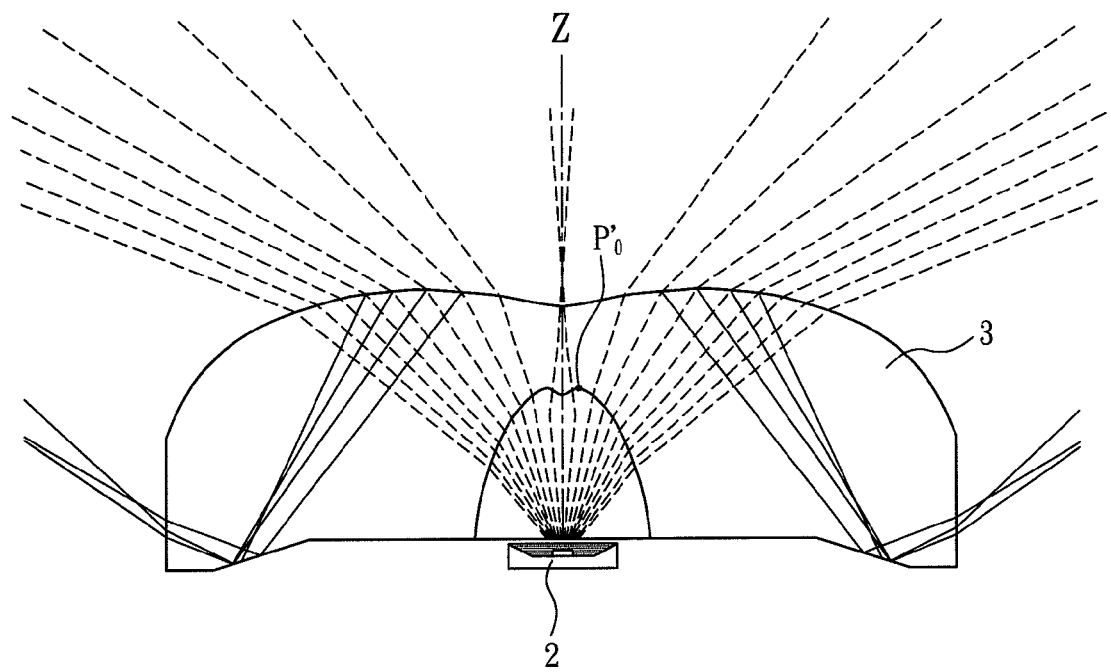
FIG. 11 is a cross-sectional view illustrating a light source device of the fifth example according to the present disclosure.
Figure 12:
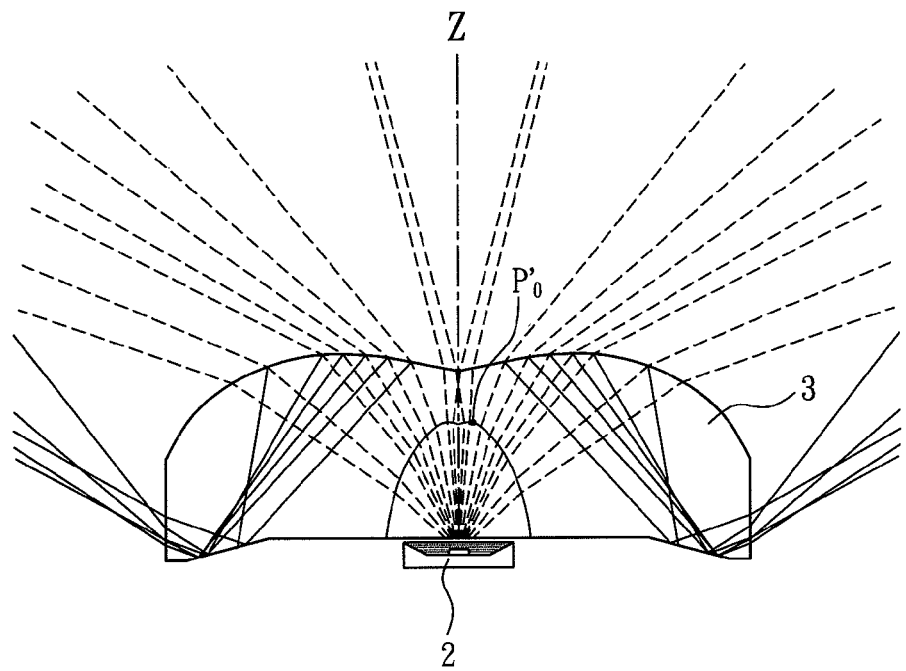
FIG. 12 is a cross-sectional view illustrating a light source device of the sixth example according to the present disclosure.

In one non-limiting embodiment, as shown in FIG. 1B and FIG. 7, the LED 2 may be buried in the cavity constituted by the light incident surface 31 of the light control lens 3. The center of the opening of the cavity constituted by the light incident surface 31 represents an incident origin O. In one non-limiting embodiment, as shown in FIG. 1A and FIG. 9, the geometric center of the emitting surface of the LED 2 may be disposed coincided with the incident origin O of the light control lens 3. In some non-limiting embodiments, as shown in FIG. 11 and FIG. 12, the geometric center of the emitting surface of the LED 2 may be disposed under a first plane where the opening of the cavity constituted by the light incident surface 31 is located. By such arrangement, a space is provided between the emitting surface of the LED 2 and the first plane, thereby improving heat dissipation efficiency of the light source device 1.

The light control lens 3 may further include at least one extending portion 34 at the periphery of the light incident surface 31. The extending portion 34 is extended to a side opposite to the light emitting surface 30 and satisfies the condition (7): $20° < \beta \leq 50°$. As shown in FIG. 2, $\beta$ represents an included angle between the optical axis Z and a connecting line from the incident origin O to a point of intersection between the light emitting surface 30 and an extension line of an inner side of the extending portion 34 in a central cross-section of the light control lens 3. In some embodiments, the extending portion 34 may further satisfy the condition (8): $51° < \gamma \leq 75°$. As shown in FIG. 2, $\gamma$ represents an included angle between the optical axis Z and a connecting line from the incident origin O to a point of intersection between the light emitting surface 30 and an extension line of an outer side of the extending portion 34 in a central cross-section of the light control lens 3. Moreover, for increasing utilization efficiency of the reflected light beam from the light emitting surface 30, as shown in FIG. 2 to FIG. 4, the extending portion 34 satisfying the condition (7) and condition (8) may include a tapered recess portion 340 for reflecting the reflected light, thereby redirecting the reflected light passing through the light control lens 3. An included angle between an optical surface of the tapered recess portion 340 and a plane passing through an apex of the tapered recess portion 340 and perpendicular to the optical axis Z is smaller than 45°. Therefore, at least a part of the light beam reflected by the tapered recess portion 340 passes through the light control lens 3 with an angle greater than 25° relative to the optical axis Z.

Furthermore, in order to ensure the light beam emitted from the LED 2 will be refracted and projected by the light control lens 3, the space between the first plane and a second plane where the emitting surface of the LED 2 is located, may be not larger than the double of $L_t$. Wherein, $L_t$ represents a maximum distance from an arbitrary point on the light emitting surface 30 to a plane through the incident origin O and perpendicular to the optical axis Z along the direction parallel with the optical axis Z. For example, in different applications, the space between the first plane and the second plane may be ranged one to three times of the thickness of the emitting layer of the LED 2 such as 0.1~0.3 mm. In some embodiments, the gap between the bottom surface 33 and the emitting surface of the LED 2 can be filled with a media having lower refractive index than the refractive index of the light control lens 3. Such media may be, for example, air, transparent silicone, or wavelength conversion component and so on.

The light control lens 3 can be made of transparent resin material or a transparent glass or other transparent material. The appropriate transparent resin material may be polymethylmethacrylate (PMMA), polycarbonate (PC), epoxy resin (EP), polylactic acid (PLA) and the like. For a purpose of cost savings, the light control lens 3 can be made from material having a refraction index in the range of 1.49~1.53.

The opening of the cavity constituted by the light incident surface 31 faces to the LED 2. Wherein, the diameter of the opening may be equal to or slightly larger than the diameter of the emitting surface of the LED 2. As shown in FIG. 2, for efficiently assembling the light control lens 3 and the LED 2, and providing a space for installation tolerance of the light control lens 3 and the LED 2, the light control lens 3 may comprise a light source fixing part 35 connected to the periphery of the light incident surface 31 and provided with an accommodating space for fixing a light source, such as the LED 2. For enhancing the light effective divergence angle of the light source device 1, the light beam emitted from the LED 2 is transmitted through media having lower refractive index than the refractive index of the light control lens 3 before it enters the light control lens 3. In different applications, said media can be air, transparent silicone, or wavelength conversion component and so on, but not limited to. To facilitate comparison, said media having lower refractive index is air in each of the following embodiments or examples.

The light emitting surface 30 of the light control lens 3 is an aspherical surface satisfying the condition (1): $0 \leq R_{ER}/R_E \leq 0.5$. As shown in FIG. 2, $R_{ER}$ represents a distance from an apex $E_t$ of the light emitting surface 30 to the optical axis Z of the light control lens 3 along a direction perpendicular to the optical axis Z. From the light emitting surface 30 to the plane including the incident origin O and perpendicular to the optical axis Z along the direction parallel with the optical axis Z, the apex $E_t$ is at the maximum distance (which is represented by "$L_t$") to the plane. $R_E$ represents the effective radius of the light emitting surface 30. The effective radius $R_E$ of the light emitting surface 30 is larger than a distance from an arbitrary point on the light emitting surface 30 to the plane through the incident origin O and perpendicular to the optical axis Z along the direction parallel with the optical axis Z. As shown in FIG. 7, the apex $E_t$ of the light emitting surface 30 can be disposed at the optical axis Z.

In other embodiments, as shown in FIG. 2, the light emitting surface 30 may further include a first recession portion 300 disposed at the center of the light emitting surface 30, and a convex portion 301 connected to the outer periphery of the first recession portion 300. In such embodiment, the apex $E_t$ may be at the junction between the first recession portion 300 and the convex portion 301. Moreover, the light emitting surface 30 may further satisfy the condition (6): $0 < R_{E0} \leq 0.01$ mm. Wherein, $R_{E0}$ represents a radius of curvature of the light emitting surface 30 at the point of intersection with the optical axis Z. By the condition (6), the refractive power of the light emitting surface 30 can be properly enhanced, the luminous intensity of the light beam near the optical axis Z can be decreased, and the light beam far from the optical axis Z can be refracted toward the direction perpendicular to the optical axis Z. Therefore, the light source device 1 using the light control lens 3 can provide improved illumination uniformity and divergence angle. δ represents an include angle between a tangent A of an arbitrary point on the light emitting surface 30 and a horizontal line B through the point. ε represents an include angle between the optical axis Z and a connecting line from the incident origin O to the arbitrary point on the light emitting surface 30. The light emitting surface 30 may satisfy the condition that δ increases as ε increases. Wherein, the included angle between the tangent of the apex $E_t$ and the horizontal line through the apex $E_t$ is zero.

Moreover, for different applications, the first recession portion 300 of the light emitting surface 30 may be a convex surface dropping from an inner edge of the convex portion 301 toward the light incident surface 31. That is, the first recession portion 300 is the convex surface facing toward the incident origin O.

In some embodiments, for helping prevent stray light, the light emitting surface 30 can further comprise a vertical portion 302 approximately parallel with the optical axis Z and connected to the outer periphery of the convex portion 301. The light beam is further refracted toward the direction perpendicular to the optical axis Z by the first recession portion 300, such that luminous intensity of the redistributed light beam in a region near the optical axis Z can be decreased so as to eliminate the brightness difference in a light pattern generated by the light source device 1. Simultaneously, the light effective divergence angle of the light source device 1 is increased.

In all embodiments of the present disclosure, aspherical surfaces of the light control lens 3 are defined, but should not be limited to, by an aspherical surface formula as the following equation:

$$Z(h) = \frac{ch^2}{1 + \sqrt{(1-(1+K)c^2h^2)}} + A_2h^2 + A_4h^4 + A_6h^6 + A_8h^8 + A_{10}h^{10} + A_{12}h^{12} + \dots \qquad \text{condition (9)}$$

wherein, Z(h) is the distance (SAG value) from any point on an optical surface of the lens to the tangential plane of the point of intersection of the optical surface and an optical axis of the lens along the direction of an optical axis thereof; c is the curvature of the optical surface on the optical axis; h is the distance (height) from any point on an optical surface of the lens to the optical axis along the direction perpendicular to the optical axis of the lens; K is the conic constant, and $A_2 \sim A_N$ are the $2^{th} \sim N^{th}$ order aspherical coefficients. However, it must be noted that the above mentioned aspherical surface formula is merely one of means to express the shape of an aspherical surface; any aspherical surface formula for defining an axially symmetrical aspherical surface should be available to use to define the aspherical surface(s) of the light control lens 3 of the present disclosure.

As shown in FIG. 2, in the light incident surface 31, L1 represents a distance from the incident origin O to the light incident surface 31; and θ represents an included angle between the optical axis Z and a connecting line from the incident origin O to the arbitrary point on the light incident surface 31. The light incident surface 31 satisfies the condition that L1 decreases as θ increases, at least in the range of π/18<θ<2π/9. By such combination of the light incident surface 31 and the light emitting surface 30, a part of the light beam can be partially reflected at the light emitting surface 30 of the light control lens 3.

Figure 6:
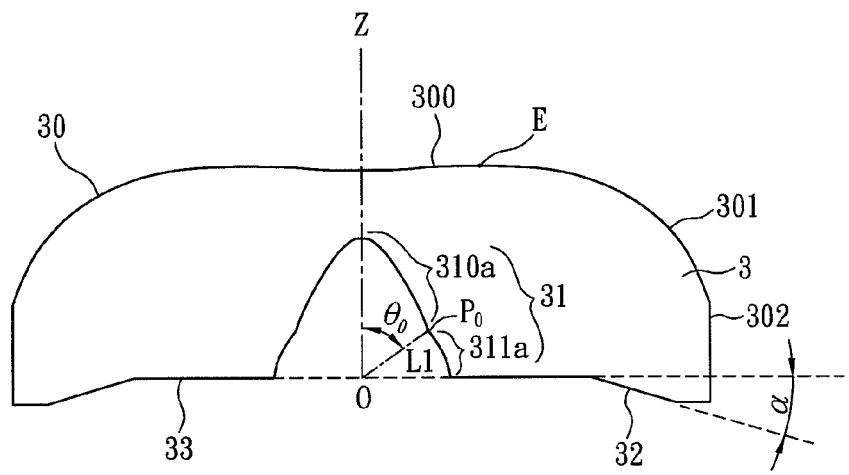
FIG. 6 is a central cross-sectional view of a light control lens according to another embodiment of the present disclosure.

In some embodiments, as shown in FIG. 6, the light incident surface 31 is symmetrical to the optical axis Z, and includes a first optically active area 310a, a second optically active area 311a, and a first optical path conversion point $P_0$. The first optically active area 310a is disposed at the center of the light incident surface 31. The second optically active area 311a is connected with a periphery of the first optically active area 310a. For different applications, the second optically active area 311a can form a concave surface or convex surface facing toward the incident origin O. The first optical path conversion point $P_0$ is disposed at the junction between the first optically active area 310a and the second optically active area 311a. As shown in FIG. 6, $θ_0$ represents an included angle between the optical axis Z and a connecting line from the first optical path conversion point $P_0$ to the incident origin O. The first optical path conversion point $P_0$ satisfies the condition (2): $0.71 \geq \cos θ_0 \geq 0.51$. In this embodiment, the light incident surface 31 satisfies the condition that L1 decreases as θ increases in the range of $θ<θ_0$; however, L1 increases or maintains a certain value as θ increases in the range of $θ_0 \geq θ$. The light beam from the LED 2 with different incident angle can be refracted differently, so as to improve the divergence angle and the light distribution uniformity of the light source device 1 by the light incident surface 31, according to the shapes of the first optically active area 310a and the second optically active area 311a and the Snell's law. In detail, by such feature, the light incident surface 31 can be provided with proper refractive power to refract the light beam near the optical axis Z with higher intensity toward the direction perpendicular to the optical axis Z. Therefore, luminous intensity of the redistributed light beam in the region near the optical axis Z can be decreased, thereby compensating luminous intensity to the region far from the optical axis Z, and improving the light distribution uniformity of the light source device 1. In a preferred embodiment, the light control lens 3 may satisfy condition (1) to condition (3), such that the refractive power of the light control lens 3 can be properly controlled to redistribute luminous intensity of the light beam near the optical axis Z. Therefore, a center darker region of a light pattern generated by the light source device 1 can be controlled to be difficult to distinguish for enhancing light distribution uniformity. For example, the diameter of the center darker region can be decreased at an appropriate size, or the illumination difference between the center darker region and the other region of the light pattern can be eased.

Further, in an optional embodiment, in order to prevent light being excessively concentrated by the second optically active area 311a, the second optically active area 311a may be provided with microstructures. Wherein, the aspect ratio of each microstructure is too small to affect the distance from the incident origin O to the second recession portion 311a. For example, microstructures may be selected from, but is not limited to, the group consisting of Fresnel structure, sawtooth structure, sandblasted surface, or irregular surfaces, and combinations thereof.

In other embodiments, as shown in FIG. 2, the light incident surface 31 of the light control lens 3 can be an aspherical surface. The light incident surface 31 includes a first optically active area 310b, a second optically active area 311b, and a second optical path conversion point $P'_0$. The first optically active area 310b is disposed at a center of the light incident surface 31, and comprises a second recession portion 3100. The second recession portion 3100 is defined by the region where is surrounded by an apex of light incident surface 31. The second optically active area 311b is connected with a periphery of the first optically active area 310b, and forms a concave surface facing toward the incident origin O. The second optical path conversion point $P'_0$ is disposed at the junction between the first optically active area 310b and the second optically active area 311b. An included angle between the optical axis Z and a connecting line from the incident origin O to the second optical path conversion point P'$_0$ is represented by θ'$_0$. In this embodiment, the light incident surface 31 satisfies the condition that L1 increases as the angle θ increases in the range of θ<θ'$_0$; however, L1 decreases as the angle θ increases in the range of θ'$_0$≤θ≤45°. Thus, the light beam respectively incident to the first optically active area 400 and the second optically active area 401 will be refracted with different effect according to each special surface design, and thereby light distribution uniformity and light effective divergence angle would be improved.

The light beam incident on the second recession portion 3100 can be concentrated, such that the weakened luminous intensity of the central region of the light pattern generated by the light source device 1 caused by the high refractive power of the light control lens 3 can be compensated. Therefore, a problem of the central darker area of a light pattern caused by a conventional light control lens which refracts most of the light beam toward the direction perpendicular to the optical axis for improving the light effective divergence angle can be overcome. However, a poor design of the second recession portion 3100 will bring about a significantly brighter paraxial region in a light pattern of the light source device 1. To prevent the above problem, in this embodiment, the light control lens 3 has to satisfy the conditions (5) and (6), such that a light pattern with both two advantages of high light-scattering ability and high uniformity of light distribution can be provided.

Moreover, the first optically active area 310b of the light incident surface 31 having the second recession portion 3100 may satisfy the condition that, with the increasing of an included angle between the optical axis Z and a connecting line from the incident origin O and the arbitrary point on the first optically active area 310b, a slope of the tangent of the arbitrary point on the first optically active area 310b first may increase and then decrease. In a preferred embodiment, the slope of the tangent of the arbitrary point on the first optically active area 310b is changed smoothly. Further, in an optional embodiment, in order to prevent light excessive concentration in the paraxial region, the second recession portion 3100 may be provided with microstructures. Wherein, the aspect ratio of each microstructure is too small to affect the distance from the incident origin O to the second recession portion 3100. For example, microstructures may be selected from, but is not limited to, the group consisting of Fresnel structure, sawtooth structure, sandblasted surface, or irregular surfaces, and combinations thereof.

Figure 5:
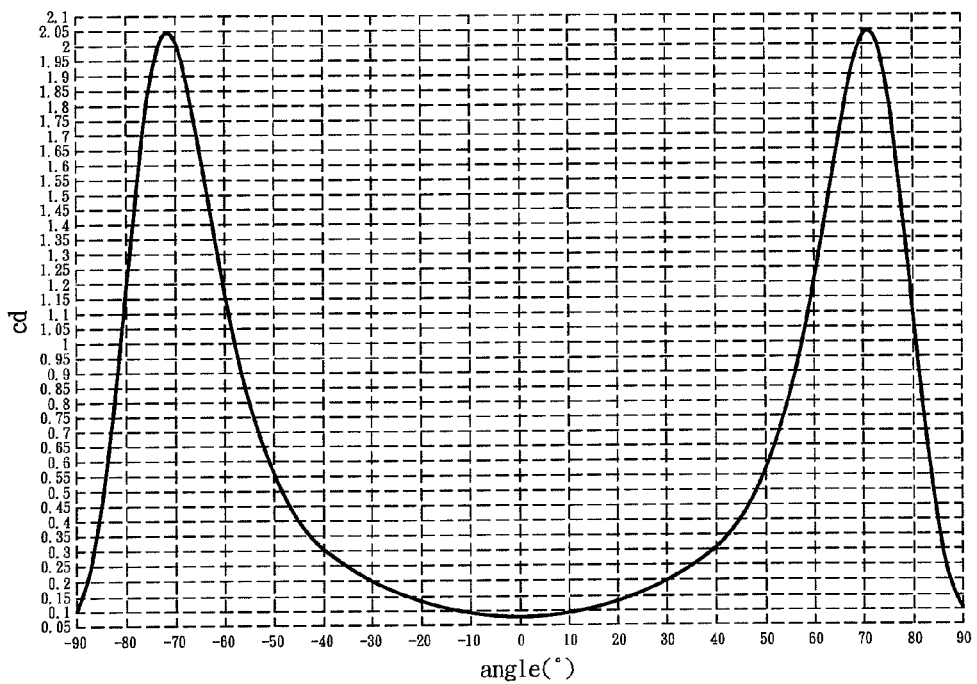
FIG. 5 is a schematic diagram showing a polar candela distribution plot of a light source device according to one embodiment of the present disclosure.

The TIR inclined surface 32 is opposite to the light emitting surface 30, and at a peripheral side of the light incident surface 31. An included angle α between the TIR inclined surface and the plane perpendicular to the optical axis Z is less than 45°. When the light beam from the LED 2 enters the light control lens 3 through the light incident surface 31, and then is incident at the light emitting surface 30, at least a part of the light beam reflected from the light emitting surface 30 is totally internally reflected by the TIR inclined surface 32, and then passes through the light control lens 3. By the TIR inclined surface 32, the light utilization efficiency of the light source device 1 can be improved, and a light pattern with improved illumination uniformity and improved effective divergence angle can be provided. Therefore, light loss because of partial reflection at the light emitting surface of the conventional light source devices is solved. For example, in an embodiment, in comparison to a light control lens without the TIR inclined surface, the light control lens 3 of the present disclosure, which has the same light emitting surface and the same light incident surface as the light control lens without the TIR inclined surface, is provided with 5 percent higher light utilization efficiency FIG. 5 is a schematic diagram showing a polar candela distribution plot of a light source device according to one embodiment of the present disclosure, in which it shows a luminous intensity distribution above the light emitting surface 30 of the light source device 1. As shown in FIG. 5, luminous intensity (cd) in the central region of the light pattern generated by the light source device 1 is significantly lower than in an outer region thereof. In the outer region where an included angle between an outgoing light beam and the optical axis of the light source device 1 is larger than 40°, the value of candela increases abruptly as the included angle increases. In this embodiment, an included angle ($\theta_T$) between the optical axis Z and a connecting line from the center of the emitting surface of the LED 2 to the peak of the luminous intensity of the light pattern is about 72°. The effective divergence angle ($\theta_M$) of the light source device 1 is about 162°, in which the effective divergence angle ($\theta_M$) is defined by double of the critical angle corresponding to the half of maximum luminous intensity.

In order to illustrate embodiments derived according to main technical characteristics of the present disclosure, seven types of the light control lenses 3 are set forth in the followings. However, the sizes, coefficients, factors, as well as other properties according to the light source device 1 listed below are only provided for description purpose and should not be used to limit the range of the present disclosure. In the following tables, the refractive index of each light control lens is represented by "$N_d$"; light utilization efficiency of each light source device is represented by "U"; a distance from the apex. $E_t$ of the light emitting surface 30 to the plane passing through the incident origin O and perpendicular to the optical axis Z along the direction parallel with the optical axis Z is represented by "$L_t$"; and a distance from the incident origin O to the optical path conversion point ($P_0$ or P'$_0$) is represented by "$\overline{OP_0}$ or $\overline{OP'_0}$". Other symbols related to the light source device 1 have been illustrated in the previous paragraphs, and will not be repeated here.

FIRST EXAMPLE

FIG. 7 is a cross-sectional view illustrating a light source device of the first example according to the present disclosure. In the first example, the light emitting surface 30 of the light control lens 3 has a shape according to table (1) listed below that shows coefficients of the aspherical surface formula (9).

TABLE (1)

| $R_{E0}$ (mm) | K | $A_2$ | $A_4$ | $A_6$ | $A_8$ | $A_{10}$ | $A_{12}$ |
|---|---|---|---|---|---|---|---|
| −1.014E−13 | −1.570E+02 | 1.897E−02 | −1.397E−03 | 2.083E−05 | −4.889E−07 | 9.438E−09 | −9.540E−11 |

In Table (2) listed below, it shows the data according to the first example.

TABLE (2)

| $L_t$ (mm) | $R_E$ (mm) | $R_{ER}$ (mm) | $\tan\theta_e$ | $R_i$ (mm) | $\overline{OI_0}$ (mm) | $\theta_T$ (°) | $\theta_M$ (°) | $N_d$ | U (%) | α (°) |
|---|---|---|---|---|---|---|---|---|---|---|
| 5.11 | 7.9 | 0 | 0 | 3 | 3.5 | 78 | 192 | 1.49 | 71 | 21 |

In the first example, the light emitting surface 30 is an aspherical convex surface that has an apex $E_t$ at the optical axis Z. As shown in Table (2), the effective radius $R_E$ of the light emitting surface 30 is larger than the distance $L_t$, and the ratio between the distance $R_{ER}$ and the effective radius $R_E$ satisfies the condition (1). The light incident surface 31 constitutes a bullet cavity having an opening, in which the diameter of the opening is smaller than the depth ($\overline{OI_0}$) of the cavity. The light incident surface 31 satisfies the condition that L1 decreases as θ increases, at least in the range of π/18<θ<2π/9. In this example, the diameter of the emitting surface of the LED 2 is about 2.4 mm. As shown in FIG. 7, the emitting surface of the LED 2 is a convex surface constituted by surface tension of glue, and is accommodated in the cavity constituted by the light incident surface 31. The others main technical features about the light incident surface 31 and the light emitting surface 30 according to the light control lens 3 of the present disclosure are disclosed in the previous paragraphs, therefore the same description about the light control lens 3 is omitted herein.

SECOND EXAMPLE

FIG. 8 is a cross-sectional view illustrating a light source device of the second example according to the present disclosure. In the second example, the light emitting surface 30 of the light control lens 3 has a shape according to table (3) listed below that shows coefficients of the aspherical surface formula (9).

TABLE (3)

| $R_{E0}$ (mm) | K | $A_2$ | $A_4$ | $A_6$ | $A_8$ | $A_{10}$ | $A_{12}$ |
|---|---|---|---|---|---|---|---|
| −1.558E−13 | −2.229E+06 | 2.013E−02 | −1.443E−03 | 2.083E−05 | −4.889E−07 | 9.438E−09 | −9.540E−11 |

In Table (4) listed below, it shows the data according to the second example.

TABLE (4)

| $L_t$ (mm) | $R_E$ (mm) | $R_{ER}$ (mm) | $\tan\theta_e$ | $\tan\theta_k$ | $R_i$ (mm) | $\overline{OI_0}$ (mm) |
|---|---|---|---|---|---|---|
| 4.694 | 7.75 | 2.830 | 37.365 | 0.755 | 4.000 | 3.300 |

| $\overline{OP_0}$ (mm) | $\cos\theta_0$ | $\theta_T$ (°) | $\theta_M$ (°) | $N_d$ | U (%) | α (°) |
|---|---|---|---|---|---|---|
| 2.008 | 0.707 | 70 | 156 | 1.49 | 87.6 | 15 |

In the second example, the first recession portion 300 of the light emitting surface 30 is a convex surface dropping from an inner edge of the convex portion 301 toward the light incident surface 31, in which the convex surface of the first recession portion 300 faces toward the incident origin O. As shown in Table (4), the effective radius $R_E$ of the light emitting surface 30 is larger than the distance $L_t$, and the ratio between the distance $R_{ER}$ and the effective radius $R_E$ satisfies the condition (1). The position of the first optical path conversion point $P_0$ satisfies the condition (2). The value of the condition (3) in the second example is 49.47, so the light control lens 3 satisfies the condition (3). In this example, the light incident surface 31 satisfies the condition that L1 decreases as θ increases in the range of θ<45'; however, L1 maintains at 2.008 mm as θ increases in the range of θ≥45°. That is, the second optically active area 311a is a spherical surface whose center is at the incident origin O, in which a radius of the spherical surface is 2.008 mm. The diameter of the emitting surface of the LED 2 is about 2.4 mm. As shown in FIG. 7, the emitting surface of the LED 2 is a convex surface constituted by surface tension of glue, and is accommodated in the cavity constituted by the light incident surface 31. The others main technical features about the light incident surface 31 and the light emitting surface 30 according to the light control lens 3 of the present disclosure are disclosed in the previous paragraphs, therefore the same description about the light control lens 3 is omitted herein.

THIRD EXAMPLE

FIG. 9 is a cross-sectional view illustrating a light source device of the third example according to the present disclosure. In the third example, the light emitting surface 30 of the light control lens 3 has a shape according to table (5) listed below that shows coefficients of the aspherical surface formula (9).

TABLE (5)

| $R_{E0}$ (mm) | K | $A_2$ | $A_4$ | $A_6$ | $A_8$ | $A_{10}$ | $A_{12}$ | $A_{14}$ |
|---|---|---|---|---|---|---|---|---|
| −1.558E−13 | −2.975E+04 | 1.957E−02 | 2.253E−03 | −2.770E−04 | 8.017E−06 | −4.706E−08 | −1.562E−09 | 1.907E−11 |

In Table (6) listed below, it shows the data according to the third example.

TABLE (6)

| $L_t$ (mm) | $R_E$ (mm) | $R_{ER}$ (mm) | $\tan\theta_e$ | $\tan\theta_k$ | $R_i$ (mm) | $\overline{OI_0}$ (mm) |
|---|---|---|---|---|---|---|
| 4.211 | 7.75 | 2.830 | 16.664 | 0.955 | 3.8 | 2.3 |

| $\overline{OP_0}$ (mm) | $\cos\theta_0$ | $\theta_T$ (°) | $\theta_M$ (°) | $N_d$ | U (%) | α (°) |
|---|---|---|---|---|---|---|
| 1.598 | 0.605 | 68 | 150 | 1.53 | 81.6 | 29 |

In the third example, the first recession portion 300 of the light emitting surface 30 is a convex surface dropping from an inner edge of the convex portion 301 toward the light incident surface 31, in which the convex surface of the first recession portion 300 faces toward the incident origin O. As shown in Table (6), the effective radius $R_E$ of the light emitting surface 30 is larger than the distance $L_t$, and the ratio between the distance $R_{ER}$ and the effective radius $R_E$ satisfies the condition (1). The position of the first optical path conversion point $P_0$ satisfies the condition (2). The value of the condition (3) in the third example is 17.451, so the light control lens 3 satisfies the condition (3). In this example, the light incident surface 31 satisfies the condition that L1 decreases as θ increases in the range of θ<52.7°; however, L1 increases as θ increases in the range of θ≥52.7°. As shown in FIG. 9, the second optically active area 311a forms a convex surface facing toward the incident origin O. In this example, the diameter of the emitting surface of the LED 2 is about 2.4 mm. In the light source device 1, the center of the emitting surface of the LED 2 is coincided with the incident origin O. The others main technical features about the light incident surface 31 and the light emitting surface 30 according to the light control lens 3 of the present disclosure are disclosed in the previous paragraphs, therefore the same description about the light control lens 3 is omitted herein.

FOURTH EXAMPLE

Figure 10:
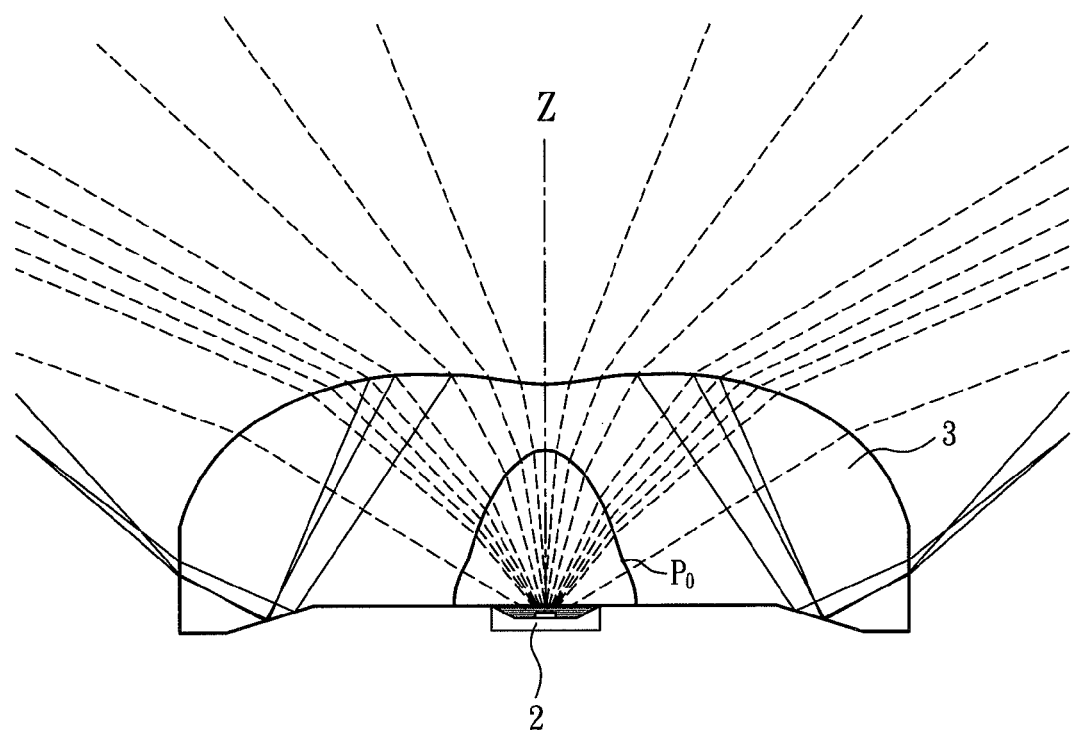
FIG. 10 is a cross-sectional view illustrating a light source device of the fourth example according to the present disclosure.

FIG. 10 is a cross-sectional view illustrating a light source device of the fourth example according to the present disclosure. In the fourth example, the light emitting surface 30 of the light control lens 3 has a shape according to table (7) listed below that shows coefficients of the aspherical surface formula (9).

TABLE (7)

| $R_{E0}$ (mm) | K | $A_2$ | $A_4$ | $A_6$ | $A_8$ | $A_{10}$ | $A_{12}$ |
|---|---|---|---|---|---|---|---|
| 1.558E−13 | −3.779E+01 | −2.043E−02 | −1.089E−03 | 2.073E−05 | −4.711E−07 | 9.438E−09 | −9.540E−11 |

In Table (8) listed below, it shows the data according to the fourth example.

TABLE (8)

| $L_t$ (mm) | $R_E$ (mm) | $R_{ER}$ (mm) | $\tan\theta_e$ | $\tan\theta_k$ | $R_i$ (mm) | $\overline{OI_0}$ (mm) |
|---|---|---|---|---|---|---|
| 5.003 | 7.9 | 2.55 | 10.345 | 0.741 | 4.000 | 3.350 |

| $\overline{OP_0}$ (mm) | $\cos\theta_0$ | $\theta_T$ (°) | $\theta_M$ (°) | $N_d$ | U (%) | α (°) |
|---|---|---|---|---|---|---|
| 2 | 0.529 | 71 | 155 | 1.49 | 88.9 | 16 |

In the fourth example, the light emitting surface 30 includes the first recession portion 300 and the convex portion 301, and satisfies the condition (1) and condition (6). The light emitting surface 30 satisfies the condition that δ increases as ε increases. The apex $E_t$ of the light emitting surface 30 is disposed at the junction between the first recession portion 300 and the convex portion 301. The included angle between the tangent of the apex $E_t$ and the horizontal line through the apex $E_t$ is zero. The position of the first optical path conversion point $P_0$ satisfies the condition (2). The value of the condition (3) in the fourth example is 13.954, so the light control lens 3 satisfies the condition (3). In this example, the light incident surface 31 satisfies the condition that L1 decreases as θ increases in the range of θ<57.8°; however, L1 increases as θ increases in the range of θ≥57.8°. As shown in FIG. 10, the second optically active area 311a forms a concave surface facing toward the incident origin O. In this example, the diameter of the emitting surface of the LED 2 is about 2.4 mm. In the light source device 1, the center of the emitting surface of the LED 2 is coincided with the incident origin O. The others main technical features about the light incident surface 31 and the light emitting surface 30 according to the light control lens 3 of the present disclosure are disclosed in the previous paragraphs, therefore the same description about the light control lens 3 is omitted herein.

FIFTH EXAMPLE

FIG. 11 is a cross-sectional view illustrating a light source device of the fifth example according to the present disclosure. In the fifth example, the light emitting surface 30 of the light control lens 3 has a shape according to table (9) listed below that shows coefficients of the aspherical surface formula (9).

TABLE (9)

| $R_{E0}$ (mm) | K | $A_2$ | $A_4$ | $A_6$ | $A_8$ | $A_{10}$ | $A_{12}$ |
|---|---|---|---|---|---|---|---|
| 1.56E−13 | −2.00E+01 | −2.58E−02 | −1.11E−03 | 2.31E−05 | −4.85E−07 | 9.44E−09 | −9.54E−11 |

In Table (10) listed below, it shows the data according to the fifth example.

TABLE (10)

| $L_t$ (mm) | $R_E$ (mm) | $R_{ER}$ (mm) | $S_{ir}$ | $R_{ir}$ (mm) | $R_i$ (mm) | $\overline{OI_0}$ (mm) |
|---|---|---|---|---|---|---|
| 5.032 | 7.75 | 2.86 | 0.509 | 0.712 | 3.500 | 2.999 |

| $\overline{OP'_0}$ (mm) | $\tan\theta'_0$ | $\theta_T$ (°) | $\theta_M$ (°) | $N_d$ | U (%) | α (°) |
|---|---|---|---|---|---|---|
| 3.226 | 0.148 | 70 | 156 | 1.51 | 89 | 16 |

SIXTH EXAMPLE

FIG. 12 is a cross-sectional view illustrating a light source device of the sixth example according to the present disclosure. In the sixth example, the light emitting surface 30 of the light control lens 3 has a shape according to table (11) listed below that shows coefficients of the aspherical surface formula (9).

TABLE (11)

| $R_{E0}$ (mm) | K | $A_2$ | $A_4$ | $A_6$ | $A_8$ | $A_{10}$ | $A_{12}$ | $A_{14}$ | $A_{16}$ |
|---|---|---|---|---|---|---|---|---|---|
| 1.4E−11 | −1.5E+01 | −2.7E−02 | −1.1E−03 | 7.3E−06 | 9.1E−07 | −5.3E−08 | 1.3E−09 | −1.6E−11 | 6.9E−14 |

In Table (12) listed below, it shows the data according to the sixth example.

TABLE (12)

| $L_t$ (mm) | $R_E$ (mm) | $R_{ER}$ (mm) | $S_{ir}$ | $R_{ir}$ (mm) | $R_i$ (mm) | $\overline{OI_0}$ (mm) |
|---|---|---|---|---|---|---|
| 4.894 | 7.8 | 3.065 | 0.32 | 0.666 | 3.8 | 3 |

| $\overline{OP_0}$ (mm) | $\tan\theta'_0$ | $\theta_T$ (°) | $\theta_M$ (°) | $N_d$ | U (%) | α (°) |
|---|---|---|---|---|---|---|
| 3.056 | 0.110 | 71 | 157 | 1.49 | 88 | 14 |

SEVENTH EXAMPLE

Figure 13:
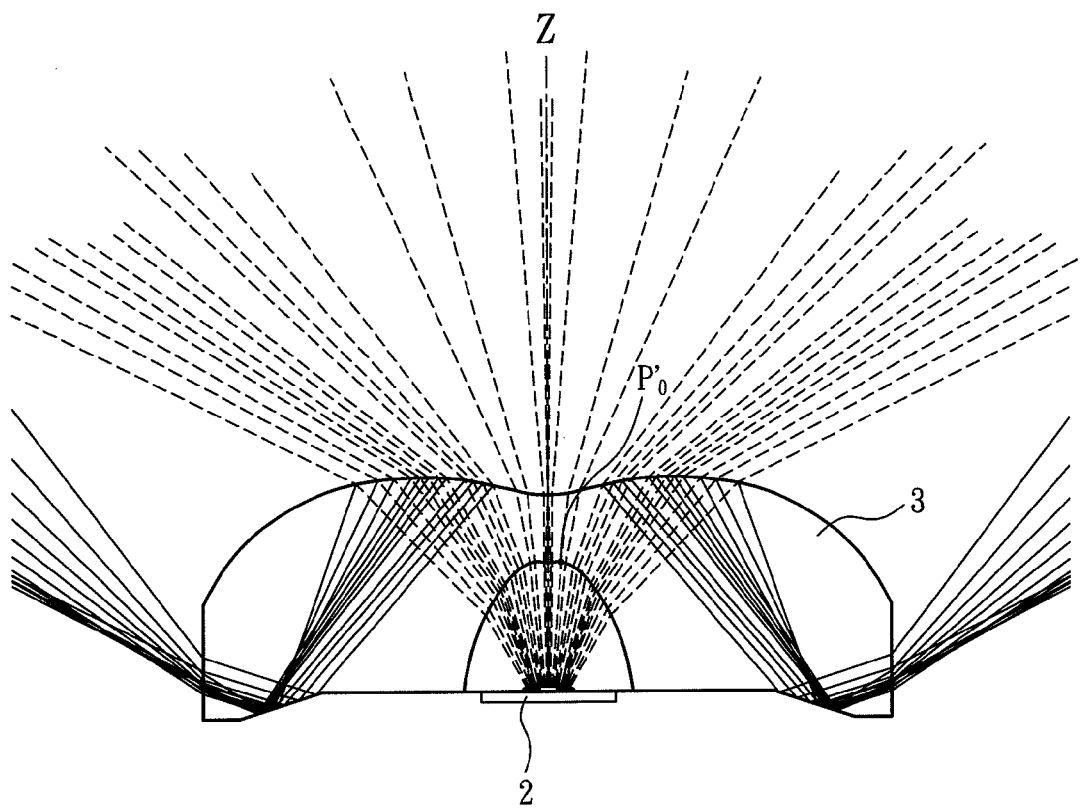
FIG. 13 is a cross-sectional view illustrating a light source device of the seventh example according to the present disclosure.

FIG. 13 is a cross-sectional view illustrating a light source device of the seventh example according to the present disclosure. In the seventh example, the light emitting surface 30 of the light control lens 3 has a shape according to table (13) listed below that shows coefficients of the aspherical surface formula (9).

TABLE (13)

| $R_{E0}$ (mm) | K | $A_2$ | $A_4$ | $A_6$ | $A_8$ | $A_{10}$ | $A_{12}$ |
|---|---|---|---|---|---|---|---|
| 1.00E−10 | −2.356E−02 | −1.205E−03 | 2.226E−05 | −4.611E−07 | −2.356E−02 | 9.628E−09 | −9.712E−11 |

In Table (14) listed below, it shows the data according to the seventh example.

TABLE (14)

| $L_t$ (mm) | $R_E$ (mm) | $R_{ER}$ (mm) | $S_{ir}$ | $R_{ir}$ (mm) | $R_i$ (mm) | $\overline{OI_0}$ (mm) |
|---|---|---|---|---|---|---|
| 4.989 | 7.8 | 3.22 | 0.31 | 0.581 | 3.8 | 2.95 |

| $\overline{OP_0}$ (mm) | $\tan\theta'_0$ | $\theta_T$ (°) | $\theta_M$ (°) | $N_d$ | U(%) | α (°) |
|---|---|---|---|---|---|---|
| 2.985 | 0.098 | 72 | 162 | 1.49 | 89.5 | 12 |

In the fifth example to the seventh example, each light emitting surface 30 includes the first recession portion 300 and the convex portion 301, and satisfies the condition (1) and condition (6). Each light emitting surface 30 satisfies the condition that δ increases as ε increases. The apex $E_t$ of each light emitting surface 30 is disposed at the junction between the first recession portion 300 and the convex portion 301. The included angle between the tangent of the apex $E_t$ and the horizontal line through the apex $E_t$ is zero. The light incident surface 31 includes a first optically active area 310b, a second optically active area 311b, and a second optical path conversion point P'$_0$. The first optically active area 310b comprises a second recession portion 3100. In these three examples, each light incident surface 31 satisfies the condition that L1 increases as the angle θ increases in the range of θ<θ'$_0$; however, L1 decreases as the angle θ increases in the range of θ'$_0$≤θ≤70°. In addition, in the sixth example and the seventh example, L1 increases as the angle θ increases in the range of θ≥80°. Each light incident surface 31 in the sixth and the seventh examples satisfies the condition that, with the increasing of the included angle θ, a slope of the tangent of the arbitrary point on the light incident surface 31 first increases and then decreases. Particularly, in the first optically active area 310b of the light incident surface 31, with the increasing of an included angle between the optical axis Z and a connecting line from the incident origin O and the arbitrary point on the first optically active area 310b, a slope of the tangent of the arbitrary point on the first optically active area 310b first smoothly increases and then smoothly decreases.

In the fifth example to the seventh example, the values of the condition (4) and the condition (5) are calculated and shown below.

| No. of example | $R_{ir}/R_i$ | $\dfrac{\overline{OI_0} \times \tan\theta_0}{S_{ir}}$ |
|---|---|---|
| fifth | 0.203 | 0.867 |
| sixth | 0.175 | 1.03 |
| seventh | 0.153 | 0.93 |

Therefore, in the fifth example to the seventh example, each light incident surface 31 satisfies the condition (4) and condition (5). In the fifth example to the seventh example, the diameter of the emitting surface of each LED 2 is about 2.4 mm. In the fifth and sixth examples, each emitting surface of each LED 2 is a flat surface, in which the center of the emitting surface of each LED 2 is disposed at a distance of 0.2 mm below the incident origin O. In addition, in the seventh example, the emitting surface of the LED 2 is a convex surface constituted by surface tension of glue, and is accommodated in the cavity constituted by the light incident surface 31. The others main technical features about the light incident surface 31 and the light emitting surface 30 according to the light control lens 3 of the present disclosure are disclosed in the previous paragraphs, therefore the same description about the light control lens 3 is omitted herein.

As shown in FIG. 7 to FIG. 13, the light control lens 3 of the present disclosure can first refract the light beam toward a direction perpendicular to the optical axis Z at the light incident surface 31, and then further refract the light beam toward a direction perpendicular to the optical axis Z at the light emitting surface 30. Particularly, at least a part of the light beam reflected from the light emitting surface is totally internally reflected by the TIR inclined surface, and then passes through the light control lens. In some embodiments, the part of the light beam reflected by the TIR inclined surface can pass through the light control lens 3 with an angle greater than 50° relative to the optical axis Z. Therefore, light reflected from the light emitting surface of the light control lens can be reused, thereby increasing light utilization efficiency of the light source device 1. Moreover, by the optical surfaces of the light control lens 3, luminous intensity in a region far from an optical axis of the light beam can be compensated to provide a light pattern with improved illumination uniformity and an effective divergence angle of at least 120°.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. An light control lens, comprising:

a light emitting surface being an aspherical surface and satisfying the following condition:

$$0 < R_{ER}/R_E \leq 0.5$$

wherein, $R_{ER}$ represents a distance from an apex of the light emitting surface to an optical axis of the light control lens along a direction perpendicular to the optical axis;

$R_E$ represents the effective radius of the light emitting surface;

a light incident surface opposite to the light emitting surface, the light incident surface constituting a cavity having an opening, wherein, a center of the opening represents an incident origin; L1 represents a distance from the incident origin to the light incident surface; $\theta$ represents an included angle between the optical axis and a connecting line from the incident origin to the arbitrary point on the light incident surface; wherein, at least in the range of $\pi/18 < \theta < 2\pi/9$, L1 decreases as $\theta$ increases; and a total internal reflection (TIR) inclined surface opposite to the light emitting surface, and at a peripheral side of the light incident surface; wherein, an included angle $\alpha$ between the TIR inclined surface and a plane perpendicular to the optical axis is less than 45°;

wherein the light incident surface includes:

a first optically active area, being disposed at a center of the light incident surface, wherein the first optically active area comprises a second recession portion;

a second optically active area, being connected with a periphery of the first optically active area; and a second optical path conversion point disposed at a junction between the first optically active area and the second optically active area;

wherein the light incident surface satisfies the following conditions:

$$R_{ir}/R_i \leq 0.3;$$

and $$0.6 \leq \frac{\overline{OI_0} \times \tan\theta'_0}{S_{ir}} < 1.1;$$

wherein, $R_{ir}$ represents a diameter of the light incident surface at the second optical path conversion point; $R_i$ represents a diameter of the light incident surface; $\overline{OI_0}$ represents a distance from the incident origin to the point of intersection between the light incident surface and the optical axis; $\theta'_0$ is an included angle between the optical axis and a connecting line from the incident origin to the second optical path conversion point; and $S_{ir}$ represents a distance from the second optical path conversion point to the point of intersection between the light incident surface and the optical axis along an optical surface of the first optically active area;

wherein, in the range of $\theta < \theta'_0$, L1 increases as $\theta$ increases; in the range of $\theta'_0 \leq \theta \leq 45°$, L1 decreases as the angle $\theta$ increases;

wherein, the effective radius of the light emitting surface is larger than a distance from an arbitrary point on the light emitting surface to a plane through the incident origin and perpendicular to the optical axis along the optical axis direction;

wherein, when a light beam enters the light control lens through the light incident surface, and then is incident at the light emitting surface, at least a part of the light beam reflected from the light emitting surface is totally internally reflected by the TIR inclined surface, and then passes through the light control lens.

2. The light control lens as claimed in claim 1, wherein the light emitting surface includes a first recession portion disposed at the center of the light emitting surface, and a convex portion connected to the outer periphery of the first recession portion; the light emitting surface satisfying the following condition:

$$0 < R_{E0} \leq 0.01 \text{ mm}$$

wherein, $R_{E0}$ represents a radius of curvature of the light emitting surface at the point of intersection with the optical axis.

3. The light control lens as claimed in claim 1, wherein in the first optically active area of the light incident surface, with the increasing of an included angle between the optical axis and a connecting line from the incident origin and the arbitrary point on the first optically active area, a slope of a tangent of an arbitrary point on the first optically active area first increases and then decreases.

4. The light control lens as claimed in claim 1, further including at least one extending portion at the periphery of the light incident surface and extending to a side opposite to the light emitting surface, wherein the at least one extending portion satisfies the following condition:

$$20° < \beta \leq 50°$$

wherein, $\beta$ represents an included angle between the optical axis and a connecting line from the incident origin to a point of intersection between the light emitting surface and an extension line of an inner side of the at least one extending portion in a central cross-section of the light control lens.

5. The light control lens as claimed in claim 4, wherein the at least one extending portion further satisfies the following condition:

$$51° < \gamma \leq 75°$$

wherein, $\gamma$ represents an included angle between the optical axis and a connecting line from the incident origin to a point of intersection between the light emitting surface and an extension line of an outer side of the at least one extending portion in a central cross-section of the light control lens.

6. The light control lens as claimed in claim 5, wherein the at least one extending portion includes a tapered recess portion for reflecting the at least a part of the light beam reflected from the light emitting surface.

7. The light control lens as claimed in claim 1, further comprising a bottom surface, being opposite to the light emitting surface and extended from the light incident surface and connected to the TIR inclined surface.

8. The light control lens as claimed in claim 1, further comprising a light source fixing part disposed at the periphery of the light incident surface for fixing a light source.

9. A light source device, comprising:
the light control lens according to claim 1;
an LED being provided with an emitting surface emitting a light beam, wherein the emitting surface is disposed corresponding to the light incident surface of the light control lens.

10. The light source device as claimed in claim 9, wherein the LED includes single LED chip having a square, rectangular or polygonal shape.

11. The light source device as claimed in claim 9, wherein the LED includes two or more LED chips provided at intervals, and a ratio between the intervals and a diameter of the emitting surface of the LED is from 0.04 to 0.9.

12. The light source device as claimed in claim 9, wherein the light emitting surface includes a first recession portion disposed at the center of the light emitting surface, and a convex portion connected to the outer periphery of the first recession portion; the light emitting surface satisfying the following condition:

$$0 < R_{E0} \leq 0.01 \text{ mm}$$

wherein, $R_{E0}$ represents a radius of curvature of the light emitting surface at the point of intersection with the optical axis.

13. The light source device as claimed in claim 9, wherein the light incident surface includes:
a first optically active area, being disposed at a center of the light incident surface, wherein the first optically active area comprises a second recession portion;
a second optically active area, being connected with a periphery of the first optically active area; and
a second optical path conversion point disposed at a junction between the first optically active area and the second optically active area;

wherein, the light incident surface satisfies the following conditions:

$$R_{ir}/R_i \leq 0.3;$$

and $$0.6 \leq \frac{\overline{OI}_0 \times \tan\theta'_0}{S_{ir}} < 1.1;$$

wherein, $R_{ir}$ represents a diameter of the light incident surface at the second optical path conversion point; $R_i$ represents a diameter of the light incident surface; $\overline{OI}_0$ represents a distance from the incident origin to the point of intersection between the light incident surface and the optical axis; $\theta'_0$ is an included angle between the optical axis and a connecting line from the incident origin to the second optical path conversion point; and $S_{ir}$ represents a distance from the second optical path conversion point to the point of intersection between the light incident surface and the optical axis along an optical surface of the first optically active area;

wherein, in the range of $\theta < \theta'_0$, L1 increases as $\theta$ increases; in the range of $\theta'_0 \leq \theta \leq 45°$, L1 decreases as the angle $\theta$ increases.

14. The light source device as claimed in claim 9, further including at least one extending portion at the periphery of the light incident surface and extending to a side opposite to the light emitting surface, wherein the at least one extending portion satisfies the following condition:

$$20° < \beta \leq 50°$$

wherein, $\beta$ represents an included angle between the optical axis and a connecting line from the incident origin to a point of intersection between the light emitting surface and an extension line of an inner side of the at least one extending portion in a central cross-section of the light control lens.

15. The light source device as claimed in claim 14, wherein the at least one extending portion further satisfies the following condition:

$$51° < \gamma \leq 75°$$

wherein, $\gamma$ represents an included angle between the optical axis and a connecting line from the incident origin to a point of intersection between the light emitting surface and an extension line of an outer side of the at least one extending portion in a central cross-section of the light control lens.

* * * * *